United States Patent [19]

Yoshimura et al.

[11] Patent Number: 5,596,419
[45] Date of Patent: Jan. 21, 1997

[54] VIDEO SYSTEM USING TWO DIFFERENT KINDS OF RECORDING MEDIA

[75] Inventors: Katsuji Yoshimura; Koji Takahashi; Yasutomo Suzuki, all of Kanagawa-ken, Japan

[73] Assignee: Canon Kabushiki Kaisha, Tokyo, Japan

[21] Appl. No.: 152,965

[22] Filed: Nov. 15, 1993

Related U.S. Application Data

[63] Continuation of Ser. No. 853,539, Mar. 18, 1992, abandoned, which is a continuation of Ser. No. 630,406, Dec. 19, 1990, Pat. No. 5,126,851, which is a continuation of Ser. No. 202,217, Jun. 3, 1988, abandoned.

[30] Foreign Application Priority Data

Jun. 16, 1987 [JP] Japan .................................. 62-150028
Jun. 16, 1987 [JP] Japan .................................. 62-150029

[51] Int. Cl.⁶ .............................. H04N 5/76; H04N 9/79; G11B 5/00
[52] U.S. Cl. .............................. 386/52; 358/311; 360/32; 386/92; 386/46
[58] Field of Search ...................... 358/335, 342, 358/341, 343, 311; 369/47, 84, 85, 88; 360/14.1, 14.2, 14.3, 72.1, 72.2, 49, 15, 32

[56] References Cited

U.S. PATENT DOCUMENTS

| | | | |
|---|---|---|---|
| 4,612,569 | 9/1986 | Ichinose | 358/22 |
| 4,660,102 | 4/1987 | Kawakami et al. | 360/14.1 |
| 4,768,105 | 8/1988 | Aoki | 360/14.1 |
| 4,777,537 | 10/1988 | Ueno et al. | 358/341 |
| 4,802,019 | 1/1989 | Harada et al. | 358/335 |
| 4,956,725 | 9/1990 | Kozuki et al. | 360/14.3 |
| 5,126,851 | 6/1992 | Yoshimura et al. | 358/335 |

FOREIGN PATENT DOCUMENTS 0176324  2/1986  European Pat. Off. ......... H04N 5/76

*Primary Examiner*—Thai Q. Tran
*Assistant Examiner*—Robert Chevalier
*Attorney, Agent, or Firm*—Robin, Blecker, Daley & Driscoll

[57] ABSTRACT

A video system is arranged to record, on a second recording medium of a relatively small capacity, a given period portion of a video signal relating to an image plane representing each of varied programs included in the video signal and information on a recorded position of each of the programs on a first recording medium which has a relatively large capacity.

16 Claims, 11 Drawing Sheets

FIG.12

VIDEO SYSTEM USING TWO DIFFERENT KINDS OF RECORDING MEDIA

This is a continuation application under 37 CFR 1.62 of prior application Ser. No. 853,539, filed Mar. 18, 1992, now abandoned, which is a continuation of application Ser. No. 630,406 filed Dec. 19, 1990, now U.S. Pat. No. 5,126,851, which was a continuation of Ser. No. 202,217, filed on Jun. 3, 1988, now abandoned.

BACKGROUND OF THE INVENTION

1. Field of the Invention

This invention relates to a video system and more particularly to a video system which is capable of looking up at a high speed a video signal recorded on a recording medium having a large capacity.

2. Description of the Related Art

The recent advancement of technology for recording at a high degree of density has come to enable a VTR to perform long-time recording on a video tape. For example, the VTR of the VHS standards has become capable of recording a video signal over a period of eight hours. As a result of this, a high speed look-up system has become necessary. To meet that requirement, there have been proposed look-up systems called VISS (a VHS index search system) and a VASS (VHS address search system) which are operating on the basis of a so-called CTL coding technique. In the CTL coding, the width (or duty ratio, to be exact) of control signals to be recorded on a video tape is arranged to have two different widths. The wider control signal is defined by the binary value of "0" and the narrower control signal by another binary value of "1". Digital signals are recorded by combining the values "0" and "1". Then, these digital signals are used for a look-up operation. In accordance with the VISS system, index codes which serve like the indices of books are marked in desired parts of the video tape. In reproduction, a look-up action is first performed either at a high speed or automatically for the leader part of a desired record before the record is reproduced in an ordinary manner. In the VASS system, address codes (address information) are marked in figures of four places beforehand and the leader part of a desired record is automatically looked up with reference to the four-place figures before reproduction.

The recording medium which permits recording many video signals or a long-time video signal is not limited to a video tape but may be selected from among other media such as an optical disc, an opto-magnetic disc, etc. which have already been developed into a practicable state. Further, the adoption of a vertical magnetizing method for high density recording has made possible long-time video recording on a magnetic disc.

By virtue of the above stated VISS or VASS system, the look-up capability of the VTR on a video tape has been greatly enhanced. However, with respect to easy and rapid confirmation of images recorded on a video tape, the look-up capability of the VTR is still insufficient. Further, since the market prices of video tapes have recently lowered to a great degree, each home is regarded as having a considerable number of tapes. In other words, the conventional look-up system is incapable of permitting the operator to easily and promptly know what kind of image is recorded on the video tape.

Such high speed look-up becomes necessary in cases where many images are recorded on an optical disc, an opto-magnetic disc, a magnetic disc of a large capacity or the like. In an apparatus, such as VTR editing system, that is arranged to have identification (ID) signals of varied kinds additionally recorded along with a video signal on the recording medium and to reproduce images in a desired sequence by using the recorded ID signals, a reproducing VTR and a recording VTR are controlled on the basis of a time code recorded on the video tape. The control parameters of the system are temporarily stored in a floppy disc or the like by means of a data recorder called a logging device to ensure the reproducibility of the details of control thereof.

In addition to the above stated system, a VTR having a special automatic reproducing function has been disclosed in Japanese Patent Application SHO 59-120963. This VTR is arranged to record control information in the form of a cue signal. The VTR disclosed facilitates data management despite having a simple structural arrangement. However, it is hardly suited for cases wherein complex operation control or a display of the contents of the record, etc. is required.

In the above stated conventional system, wherein the sequence of reproducing procedures is controlled in accordance with a program, it has been difficult to carry out a complex operation such as a loop action for slowly reproducing the record of a specific section an N number of times and to have the tape rewound to an extent corresponding to an M number of frames. It is also a problem with the prior art described that, in case where control data is to be stored in a floppy disc, the control data alone hardly enables the operator to grasp in outline the contents of the whole tape.

SUMMARY OF THE INVENTION

It is a general object of this invention to solve the above stated problems of the prior art.

It is a more specific object of the invention to provide a video system which enables the operator thereof to promptly grasp the record contents of a recording medium having a large capacity.

Under this object, a video system arranged according to this invention as an embodiment thereof comprises an input part arranged to receive a video signal; extracting means for extracting one image plane portion of the video signal as an image plane representing one of the programs included in the video signal; first recording means for recording the video signal on a first recording medium; generating means for generating time information relating to a recorded position on the first recording medium where the one image plane portion of the video signal extracted by the extracting means is recorded; and second recording means for recording, on a second recording medium of a smaller recording capacity than that of the first recording medium, the time information generated by the generating means and the one image plane portion of the video signal extracted by the extracting means.

It is another specific object of the invention to provide a video system which is capable of promptly looking up any desired program recorded on a recording medium of a large capacity.

Under that object, a video system arranged according to this invention as another embodiment thereof comprises first reproducing means for reproducing a video signal recorded on a first recording medium; extracting means for extracting one image plane portion of the video signal as an image plane representing one of a plurality of programs included in the video signal reproduced by the first reproducing means; a generating means for generating time information relating to a recorded position on the first recording medium where the one image plane portion of the video signal extracted by the extracting means; and second recording means for recording, on a second recording medium having a smaller recording capacity than that of the first recording medium, the time information generated by the generating means and the one image plane portion of the video signal extracted by the extracting means.

The above and other objects and features of the invention will become apparent from the following detailed description of embodiments thereof taken in connection with the accompanying drawings.

BRIEF DESCRIPTION OF THE DRAWINGS

FIG. 12 shows an example of a multi-image-plane display.

DETAILED DESCRIPTION OF THE PREFERRED EMBODIMENTS

Figure 1:
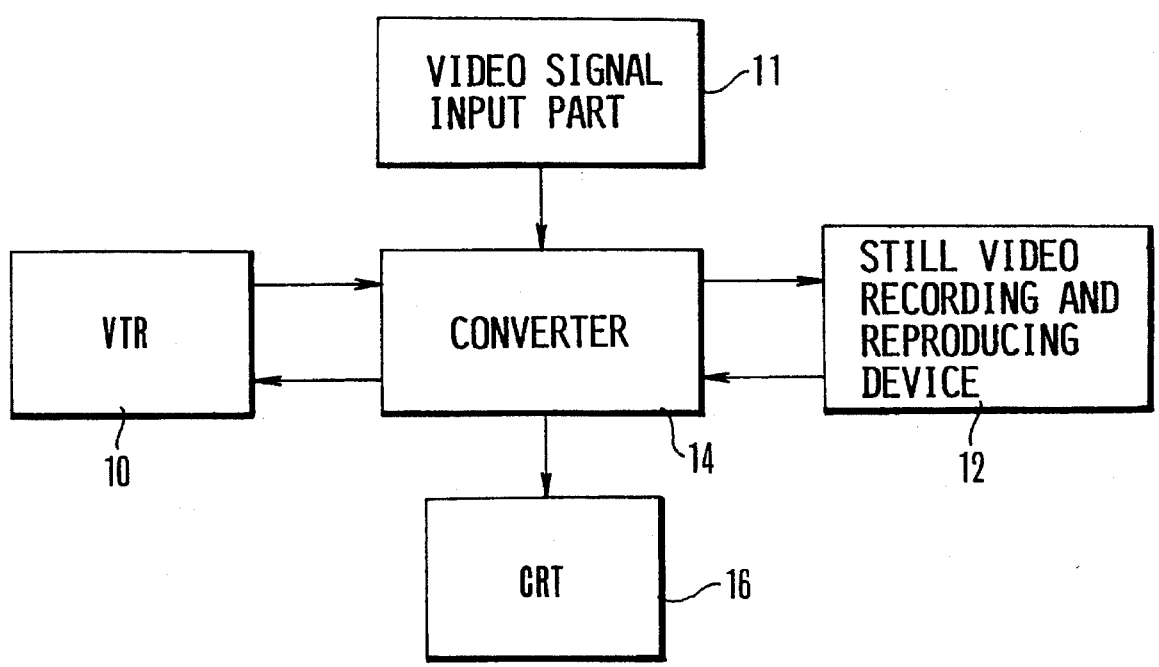
FIG. 1 is a block diagram showing in outline the whole of a video system arranged as an embodiment of this invention.

In the embodiments of this invention described below with reference to the accompanying drawings, the invention is applied to image recording and reproducing systems using magnetic tapes and magnetic discs:

FIG. 1 shows in a block diagram the arrangement of a whole system which is arranged as an embodiment of the invention to use a still video disc as a storage medium for preserving look-up data including representative images, record cassette numbers, record head addresses, recording lengths, etc. The system consists of a VTR 10 which is provided for reproduction of a video tape; a video signal input part 11; a still video disc recording and reproducing device 12 which is arranged to perform recording on and reproduction from a still video disc; a converter 14 which is arranged in between the VTR 10 and the still video recording and reproducing device 12 to perform signal conversion, operation control, etc.; and a display device 16 which is a CRT and is arranged to display look-up data supplied from the still video recording and reproducing device 12 or a reproduced image supplied from the VTR 10.

A preferred method for the use of the embodiment illustrated is as follows: The records on the magnetic tape are reproduced at a high speed. One field video signal portion of a representative image plane representing each image program recorded on the magnetic tape and an index signal, a time code, etc. corresponding to the representative image plane are then recorded on a still video disc. In confirming a part of the video tape in which a desired image is recorded, either the record contents of the still video disc are serially displayed on the display device 16 or data for a plurality of programs is displayed on the display device 16 all in one image plane. The embodiment thus permits confirmation of the outline of the contents of a plurality of programs recorded on the video tape.

Figure 2:
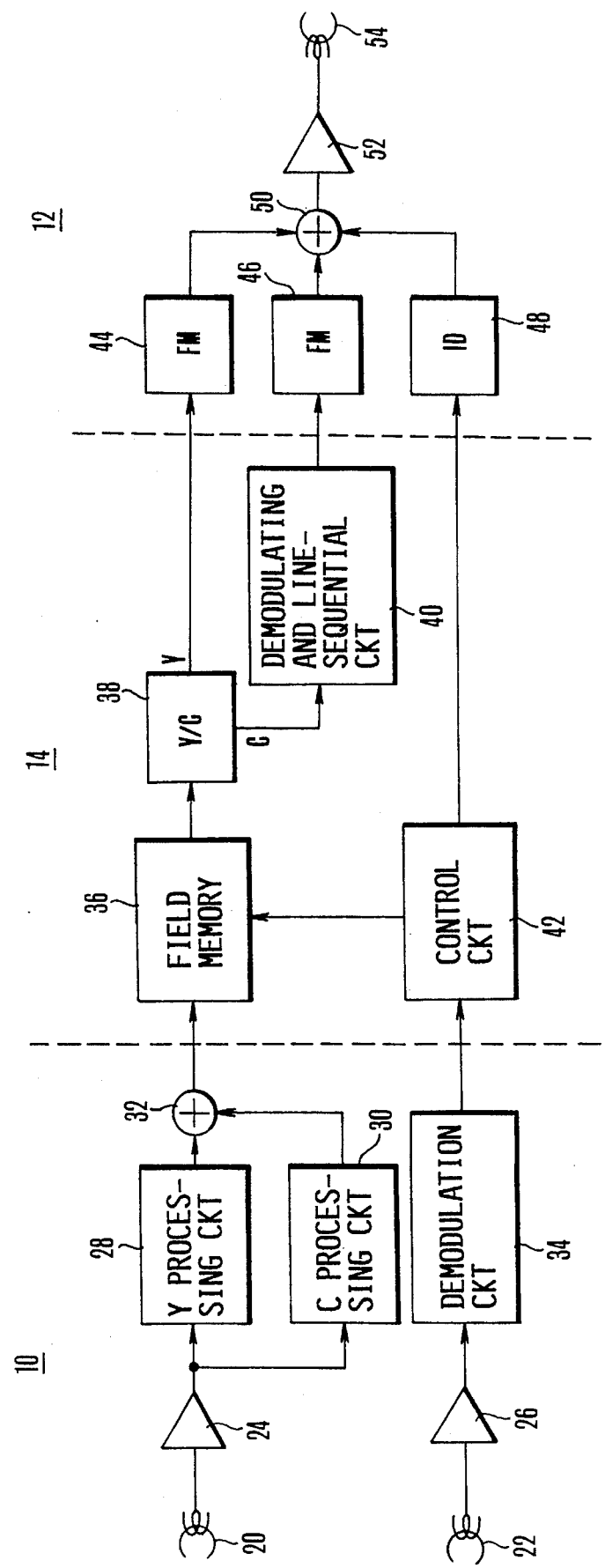
FIG. 2 is a diagram showing a signal flow taking place within the video system of FIG. 1 from a VTR to a still video recording and reproducing device.

The system part which records the look-up data for the images recorded on the video tape is arranged as follows: FIG. 2 is a block diagram showing in outline the basic arrangement of this part. The VTR 10 includes a rotary magnetic head 20; a fixed magnetic head 22; reproduction amplifiers 24 and 26; a luminance (Y) signal processing circuit 28; a chrominance (C) signal processing circuit 30; a mixer 32; and a CTL demodulation circuit 34. The converter 14 includes a field memory 36; a Y/C separation circuit 38; a chrominance signal demodulating and color-difference signal line-sequential circuit 40; and a control circuit 42 for controlling the field memory 36. The still video recording and reproducing device 12 includes a frequency modulation circuit 44 for frequency-modulating the luminance signal; a frequency modulation circuit 46 for the chrominance signal; an ID processing circuit 48; a mixer 50; a recording amplifier 52 and a recording head 54.

Figure 3:
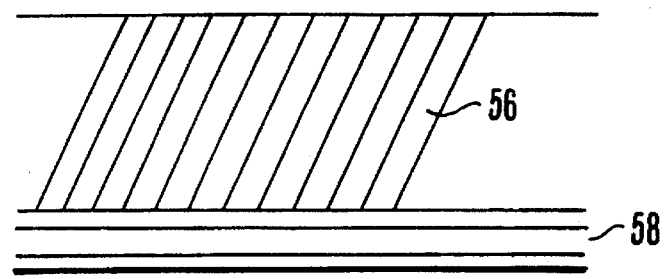
FIG. 3 shows a recording pattern obtained on a video tape.
Figure 4A:
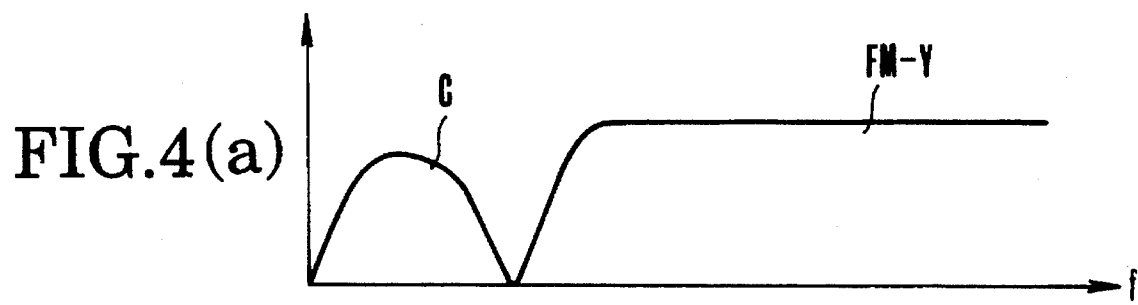
FIGS. 4(a) and 4(b) show the frequency allocation of recording signals obtained by the VTR and the video recording and reproducing device.

The arrangement shown in FIG. 2 operates as follows: The rotary magnetic head 20 traces a video signal recording area 56 which is provided on a video tape as shown in FIG. 3. The fixed head 22 traces a CTL signal recording area which is provided on the video tape in a manner as shown also in FIG. 3. A reproduced signal produced from the rotary head 20 has a frequency allocation as shown in a spectrum in FIG. 4(a). The Y signal processing circuit 28 demodulates the Y (luminance) signal which has been frequency-modulated. The C (chrominance) signal processing circuit 30 converts a carrier chrominance signal of a low carrier frequency into a carrier chrominance signal of a carrier frequency of 3.58 MHz. The mixer 32 produces in a mixed state the Y signal produced from the Y signal processing circuit 28 and the C signal produced from the C signal processing circuit 30. The demodulation circuit 34 demodulates a CTL signal obtained from the fixed head 22 and produces a signal representing an index and a time code which are indicative of a representative image plane and are required for look-up. Further, as well-known, the CTL signal is provided mainly for tracking control. However, since the CTL signal is irrelative to this invention, it is omitted from illustration.

The output of the mixer 32 is written into the field memory 36 every time the index signal is supplied to the control circuit 42. In other words, for every image plane representing one program, one field portion of the video signal indicative of the representative image plane is written into the memory 36. The field memory 36 and the control circuit 42 together form a first extracting means. The one field portion of the video signal which is written into the memory 36 is supplied to the Y/C separation circuit 38 to be divided into the Y signal and the C signal. The demodulating and line-sequential circuit 40 first demodulates the C signal separated by the Y/C separation circuit 38 to form thereby two color-difference signals R-Y and B-Y. The circuit 40 then alternately produces the color-difference signals R-Y and B-Y for every H (horizontal scanning) period.

Figure 4B:
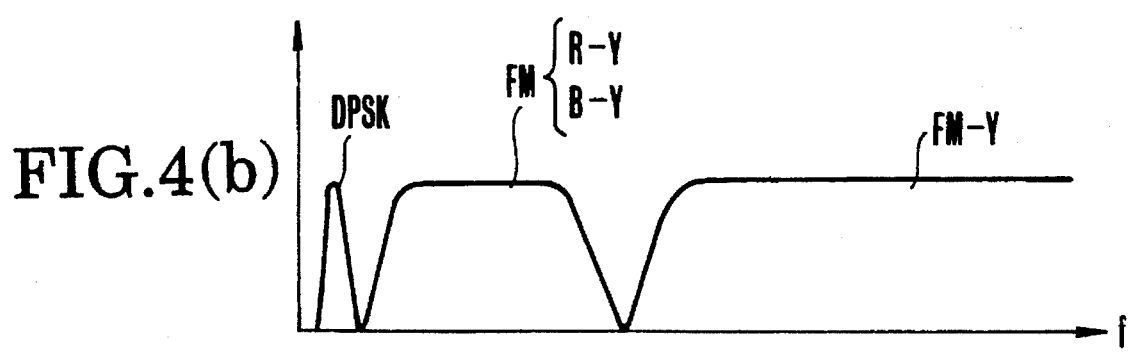

The frequency modulation circuit 44 frequency-modulates the luminance (Y) signal separated by the Y/C separation circuit 38. The other frequency modulation circuit 46 frequency-modulates a line-sequential color-difference signals produced from the demodulating and line-sequential circuit 40. In this instance, the modulated carrier frequency of the color-difference signals is arranged to be lower than that of the luminance signal. Further, the modulated carrier frequencies of the color-difference signals R-Y and B-Y are arranged to differ by 0.1 MHz from each other for a discrimination between these color-difference signals. The ID processing circuit 48 receives a signal for look-up (including an index signal and a time code signal indicative of the beginning and the end of a corresponding program) from the control circuit 42. The ID processing circuit 48 and the control circuit 42 together form a second extracting means. The ID processing circuit 48 converts the look-up signal into a DPSK signal. The mixer 50 produces the outputs of the frequency modulation circuits 44 and 46 and that of the ID processing circuit 48 by frequency-multiplexing them. The signal output of the mixer 50 has a spectral frequency distribution as shown in FIG. 4(b). The output of the mixer 50 is applied to the recording head 54 via the recording amplifier 52. The head 54 then records it on a still video disc which is not shown.

Figure 5:
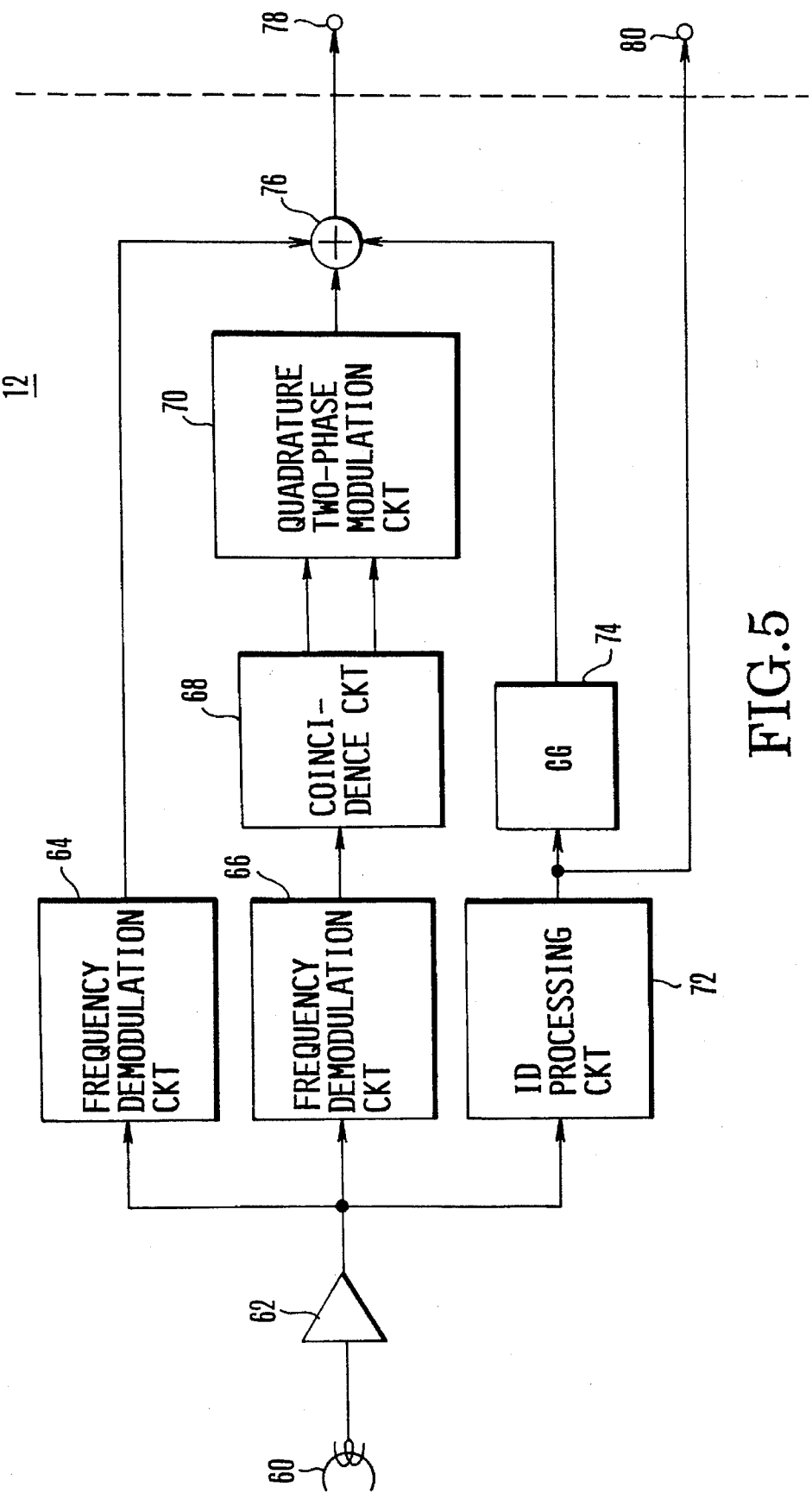
FIG. 5 is a diagram showing the signal flow taking place within the system of FIG. 1 from the still video recording and reproducing device to the VTR and a CRT.

FIG. 5 is a block diagram showing by way of example a practical arrangement of the reproducing part of the still video recording and reproducing device 12 included in the system of FIG. 1. Referring to FIG. 5, the reproducing part consists of a reproducing head 60; a reproduction amplifier 62; a frequency demodulation circuit 64 for the luminance signal; a frequency demodulation circuit 66 for the color-difference signals; a coincidence circuit 68 which is arranged to contemporize the line-sequential color-difference signals; a quadrature two-phase modulation circuit 70; an ID processing circuit 72; a character generator (CG) 74; a mixer 76; a connection terminal 78 which is provided for connection via the converter 14 to the display device 16; and another connection terminal 80 which is provided for connection via the converter 14 to the VTR 10.

A signal reproduced by the reproducing head 60 is supplied to the frequency demodulation circuits 64 and 66 and also to the ID processing circuit 72. The frequency demodulation circuit 64 demodulates a frequency-modulated luminance signal included in the reproduced signal to a base band frequency. The frequency modulation circuit 66 also demodulates frequency-modulated color-difference signals to the base band frequency and supplies them to the coincidence circuit 68. The coincidence circuit 68 includes a delay line for delaying by one H period and a change-over switch. The two color-difference signals which have been line-seriated are caused to coincide with each other by the coincidence circuit 68. The two color-difference signals which are thus contemporized are modulated by the quadrature two-phase modulation circuit 70. The ID processing circuit 72 demodulates a DPSK signal. An index signal and a time code signal which is thus obtained are supplied from the ID processing circuit 72 to the character generator (CG) 74 and also to the VTR 10 via the connection terminal 80. Upon receipt of the index signal and the time code signal, the CG 74 produces figures corresponding to these signals at suitable timing for an image plane display.

The mixer 76 mixes the luminance signal coming from the frequency demodulation circuit 64, a carrier chrominance signal coming from the quadrature two-phase modulation circuit 70 and a pattern signal coming from the CG 74. A mixture signal thus obtained is produced from the mixer 76 to the display device 16 via the connection terminal 78. At the display device 16, the index signal which is recorded as an ID signal and the time code signal which is also recorded as an ID signal and is indicative of the beginning and the end of a corresponding program are displayed in a state of being superimposed on one field portion of an image corresponding to a representative image plane.

With the look-up information in a state of having been recorded on a still video disc by the still video recording and reproducing device 12, images recorded on a video tape can be looked up in the following manner: First, a record on the still video disc is reproduced by the still video recording and reproducing device 12 to have the look-up information displayed by the display device 16. Then, a desired cut (image plane) is selected. An instruction for this selection is given by means of an input device such as a key-board which is not shown. In response to this instruction, the still video recording and reproducing device 12 transmits applicable look-up information to the VTR 10. The VTR 10 feeds the video tape at a high speed to an applicable part thereof in accordance with the look-up information. The VTR 10 then reproduces a desired image in a normal manner and applies the reproduced image to the display device 16. As a result, the display state of the display device 16 changes from a still image display for look-up designation over to a motion image display of the desired image.

It goes without saying that a circuit for signal exchange between the VTR 10 and the still video recording and reproducing device 12, a selection switch for making a selection between the display of an images reproduced by the still video recording and reproducing device 12 and the display of an image reproduced by the VTR 10, etc. are disposed at the converter 14.

As reflected in the recently published S-VHS standards, the picture quality of the images recorded on video tapes have been saliently improved. One field portion of an image signal which is a part of a motion picture can be adequately recorded or reproduced as a still picture. Therefore, the system described in the foregoing is extremely convenient as means for finding the contents of a motion picture.

Further, in the embodiment described, the image plane representing each program and the index signal, etc. for that representative image plane are arranged to be recorded on the still video disc when the VTR 10 performs a reproducing operation. However, they may be changed to be recorded at the time of recording by the VTR 10.

Figure 6:
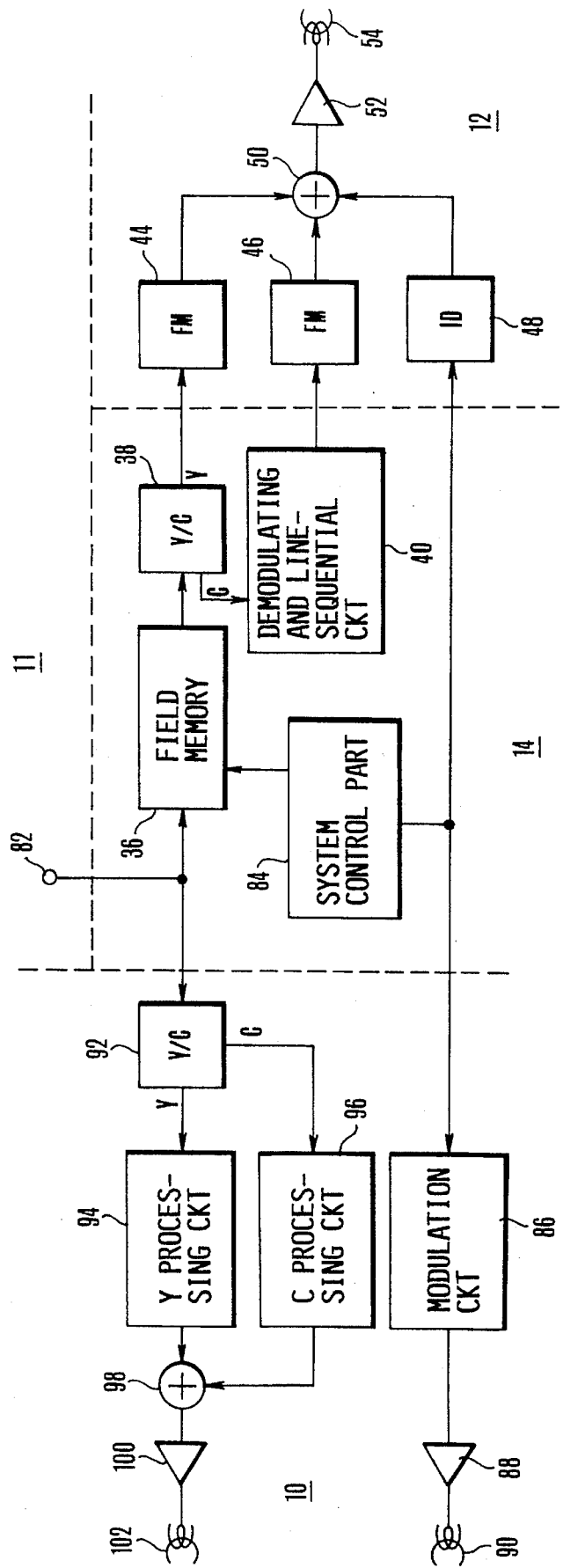
FIG. 6 is a diagram showing the signal flow taking place within the system of FIG. 1 from the still video recording/reproducing device.

FIG. 6 shows a circuit arrangement which enables the system of FIG. 1 to have the look-up information recorded by the still video recording and reproducing device 12 when a video signal recording operation is performed by the VTR 10. In FIG. 6, the component parts similar to those shown in FIG. 2 are indicated by the same reference numerals and the details of them are omitted from the following description. A signal supplied via a terminal 82 to a video signal input part 11 is divided into a luminance signal and a chrominance signal by a Y/C separation circuit 92. The luminance signal thus separated is frequency-modulated by a luminance signal processing circuit 94. Meanwhile, the chrominance signal is supplied to a chrominance signal processing circuit 96 to have its carrier frequency converted to a lower band. The luminance and chrominance signals processed by these processing circuits 94 and 96 are mixed together at a mixing circuit 98. A mixed signal thus obtained is supplied via a recording amplifier 100 to a magnetic rotary head 102 to be recorded within the area 56 shown in FIG. 3. Meanwhile, a known CTL signal is supplied via an amplifier 88 to a fixed magnetic head 90 to be recorded within the area 58 as shown in FIG. 3.

When a recording instruction is given to a system control part 84 from an operation part (not shown) for recording an index image plane during the above stated recording operation of the VTR 10, the system control part 84 controls a CTL modulation circuit 86 to change the duty of the CTL signal to be recorded. Then, an index signal, etc. are recorded within the area 58. An image plane representing a currently recording program is recorded within the field memory 36 with a signal writing action on the field memory 36 brought to a stop at this moment. At the same time, the system control part 84 causes the index signal and the time code signal to be supplied to the ID processing circuit 48. This enables the system to record the look-up information, the representative image plane, etc. in the same manner as described in the foregoing with reference to FIG. 2.

While the embodiment described in the foregoing used a video tape as a first recording medium and a still video disc as a second recording medium, the invention is not limited to the use of these recording media. In accordance with the invention, other recording media including the optical disc mentioned in the foregoing and a solid state memory such as a semiconductor memory, etc. are also usable. As apparent from the foregoing description, even in case where many programs are recorded on the first recording medium, the embodiment is capable of enabling the operator to easily and promptly confirm the part at which any of the programs is recorded and the contents of the program through an image representing the record of the program. The embodiment is capable of promptly shifting its operation to the reproduction of a desired program. The embodiment also enables the operator to confirm the amount of remaining recordable portion of the first recording medium by reproducing and displaying the record of the recording medium provided for look-up information.

Figure 7:
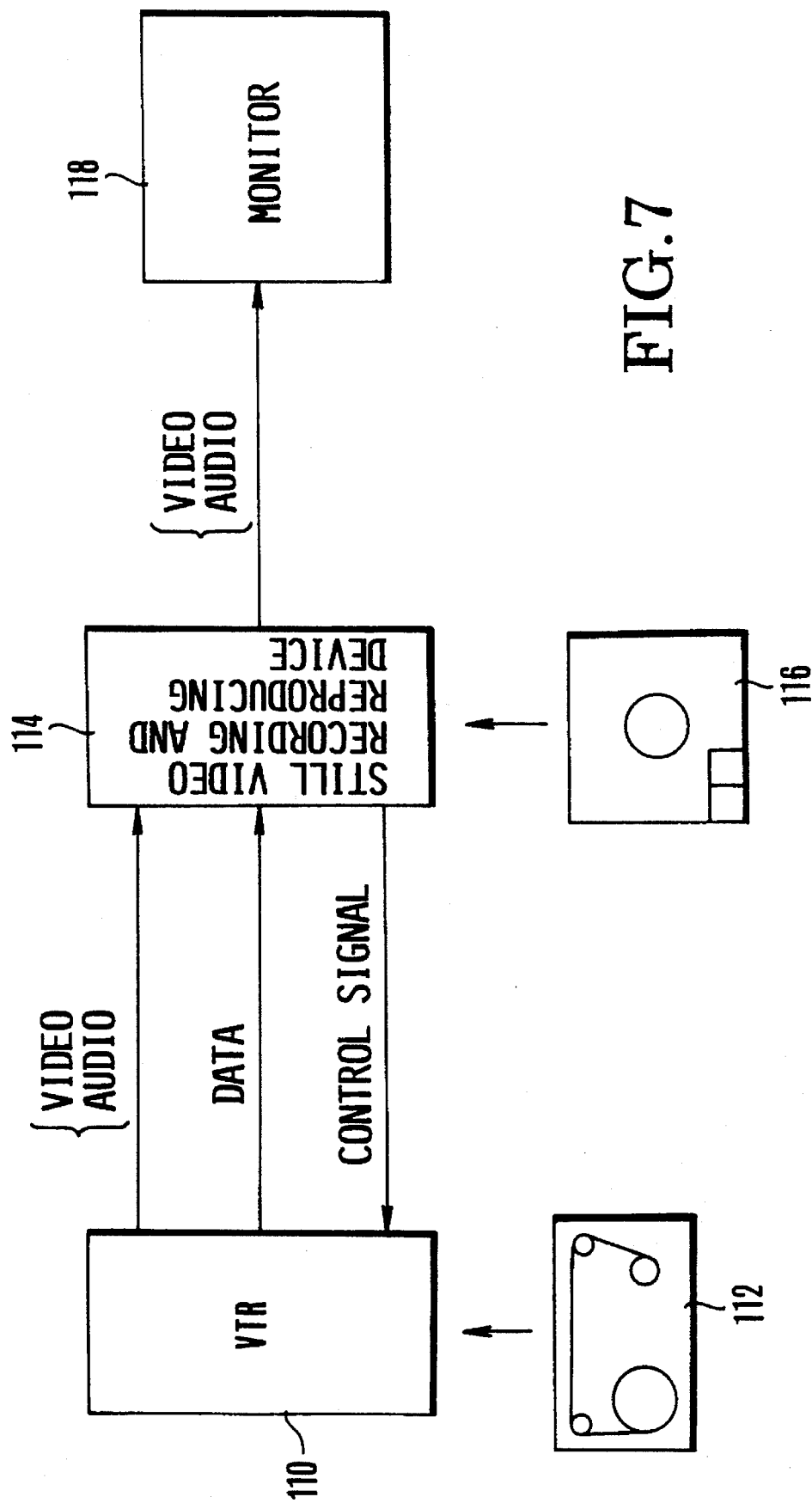
FIG. 7 is a diagram showing in outline the whole of a video system arranged according to this invention as another embodiment thereof.
Figure 8:
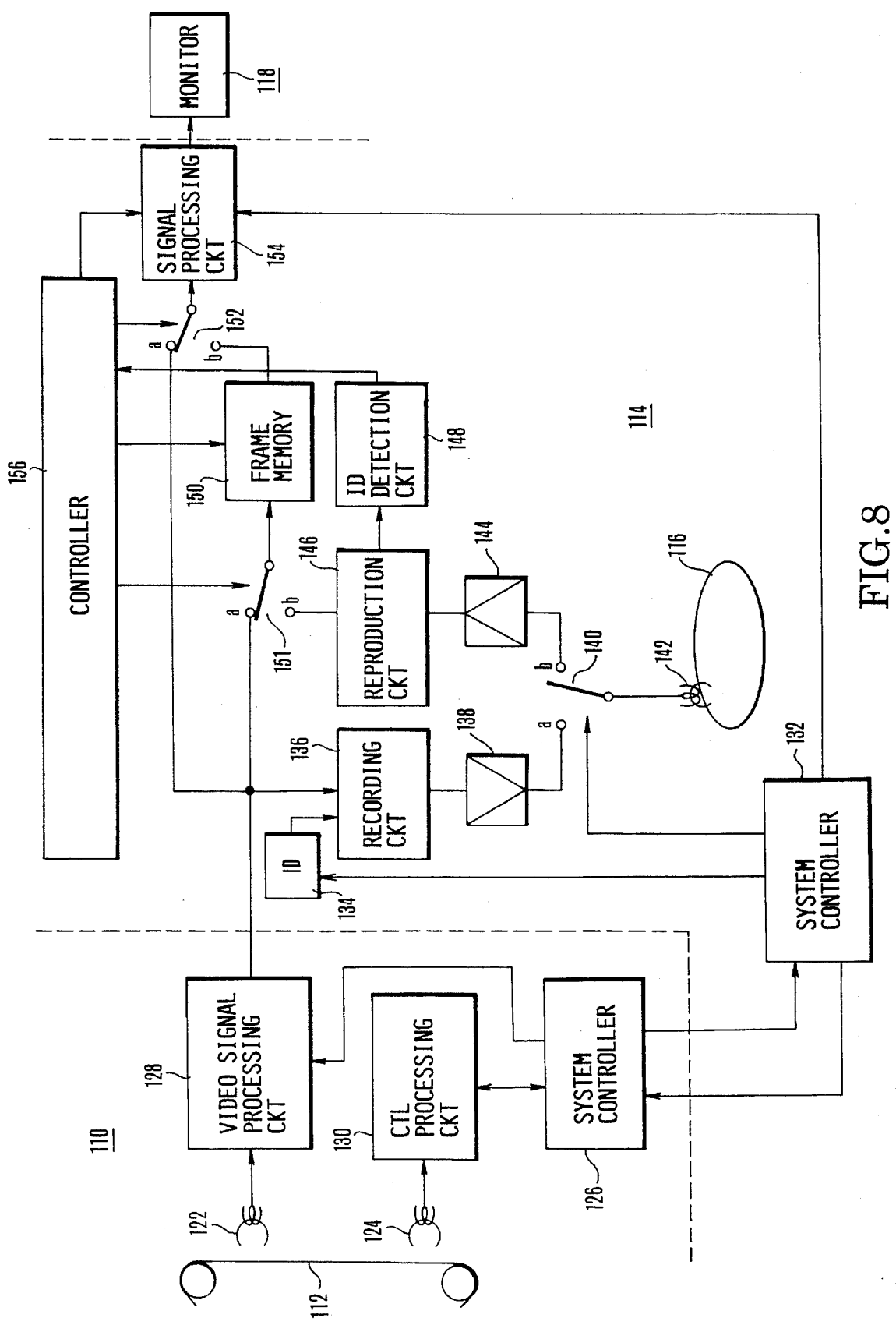
FIG. 8 is a diagram showing by way of example the practical arrangement of the system of FIG. 7.

FIG. 7 is a block diagram showing, as another embodiment of this invention, the arrangement of a still video recording and reproducing device for storing, on a still video disc, information required for control over the reproducing operation of a VTR. Referring to FIG. 7, a VTR 110 is arranged to reproduce motion image (and sounds) information from a magnetic tape 112. A still video recording and reproducing device 114 which is arranged to record on a still video disc 116 a still image and ID information thereon and to reproduce the record from the disc 116. A reference numeral 118 denotes a monitor. The VTR 110 transfers to the still video recording and reproducing device 114 the motion image information (with sound information) and time information corresponding to the motion image information (such as a timing code indicating a record position, a recording length of time, etc.). Conversely, the still video recording and reproducing device 114 transfers to the VTR 110 a control signal for controlling the operation of the latter. A video signal which is reproduced (with an audio signal) from the video tape 112 is applied as desired to the monitor 118. Further details of processing procedures are as described below:

Various scenes (or cuts) taken by a video camera are recorded on the video tape 112. In the following description, the cuts that are deemed to be necessary are assumed to be selected from among these cuts and to be reproduced in a programed manner. More specifically, a reproducing method for each of the necessary cuts is first recorded on the still video disc 116. FIG. 8 shows further details of the arrangement of FIG. 7.

Referring to FIG. 8, the VTR 110 includes a rotary head 122 which is arranged to reproduce a record from the video signal recording area of the video tape 112; a fixed head 124 is arranged to reproduce a record from the control (CTL) track; a system controller 126 which is arranged to control the whole VTR 110; a video signal processing circuit 128 which is arranged to process the signal reproduced by the rotary head 122 and to produce a composite video signal thus obtained; and a CTL processing circuit 130 which is arranged to shape the wave form of a CTL signal reproduced by the fixed head 124. The CTL processing circuit 130 thus obtains CTL code information and supplies it to the system controller 126 in the form of a digital signal. Upon receipt of the digital signal, the system controller 126 decodes it into a time code.

In the still video recording and reproducing device 114, a system controller 132 is arranged to perform overall control over each part and to exchange signals between the system controller 126 of the VTR 110. The system controller 132 thus receives the time code from the system controller 126. The still video recording and reproducing device 114 further includes an ID generating circuit 134 which is arranged to generate an ID signal for a DPSK signal; a recording circuit 136 which is arranged to convert the ID signal generated by the ID generating circuit 134 into a signal recordable on the disc 116; a recording amplifier 138; a recording/reproduction change-over switch 140; a magnetic head 142 for recording/reproduction; a reproduction amplifier 144; a reproduction circuit 146 which is arranged to process a signal reproduced by the head 142 and to produce it as a reproduced video signal; an ID detection circuit 148 which is arranged to detect the ID signal from the reproduced signal obtained by the head 142 and decode the ID signal; a frame memory 150; a selection switch 151 which is arranged to select either a reproduced still picture signal obtained from the disc 116 or the video signal coming from the VTR 110; a selection switch 152 is arranged to select either a motion picture or a still picture; and a signal processing circuit 154. The signal processing circuit 154 is arranged, for example, to generate characters according to the time code and to superimpose them on the video signal.

In the normal reproduction mode of the VTR 110, the output of the video signal processing circuit 128 of the VTR is applied via the switch 152 and the signal processing circuit 154 to the monitor 118. Then, among images, etc. confirmed by means of the monitor 118, one series of information parts considered necessary are handled as one program. The program thus obtained is recorded on the disc 116 after it is processed into information required for reproduction control. This reproduction control information includes time information on the starting and ending points of one program and some representative image plane that clearly indicates the contents of the program, such as the image plane of the first field.

Figure 9:
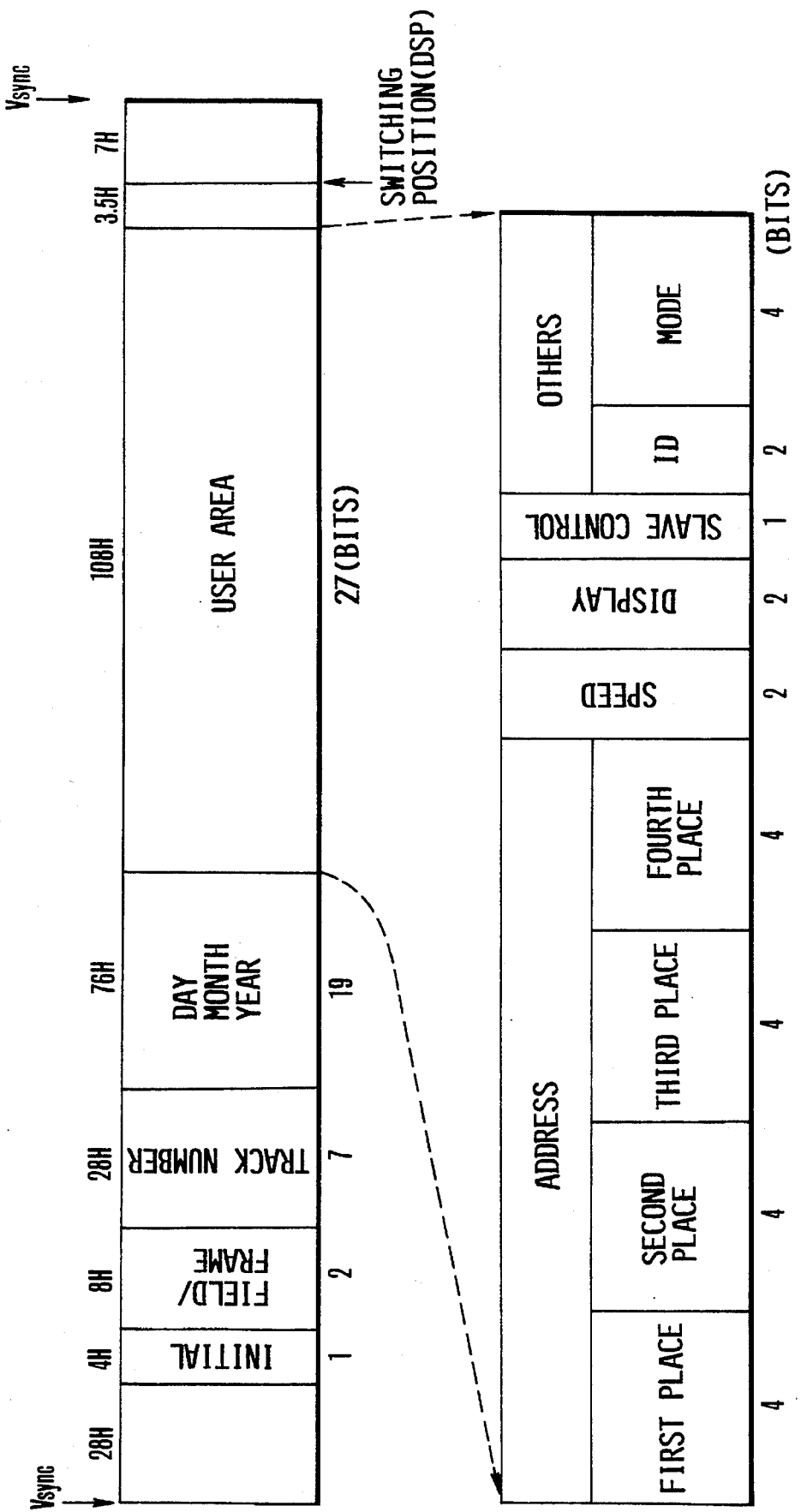
FIG. 9 shows the data format of ID signal of a still video recording and reproducing device of FIG. 9.

FIG. 9 shows the distribution of bits for the ID code within one field period. Referring to FIG. 9, 27 bits are provided for a user area. For example, the address, a designated reproduction speed, a display or no display, etc. are set in a manner as shown in FIG. 9.

With the above stated representative image plane determined, the reproduction control information is recorded on the still video disc 116. In this case, the connecting position of the switch 140 is on the side of its contact a. The recording circuit 136 receives and processes the DPSK signal from the ID generating circuit 134 and the video signal from the video signal processing circuit 128. Theses signals are then frequency-multiplexed as mentioned in the foregoing. The frequency-multiplexed signal is amplified by the recording amplifier 138 and is recorded on the disc 116 by the head 142. The reproduction control information for many cuts can be thus serially recorded on the still video disc 116.

In reproducing the record from the disc 116, the connecting position of the switch 140 is shifted to its contact b. The reproduction circuit 146 reproduces a video signal from the signal reproduced by the head 142. The ID detection circuit 148 detects the ID signal from the reproduced signal and produces the ID signal by decoding it. In accordance with the ID signal produced from the ID detection circuit 148, the controller 156 controls the frame memory 150, the switches 151 and 152 and the signal processing circuit 154. The frame memory 50 is controlled with respect to the signal taking-in timing thereof.

Reproduction control is performed in accordance with information set within the user area in the following manner: A total of 4×4 bits are used for the address. This corresponds to the four-place time code obtained in the case of the CTL coding of VHS mentioned in the foregoing. A time code indicative of the head part of the cut is thus stored in 16 bits at the applicable address.

Next, data "speed" (two bits) designates a speed at which the applicable cut is to be reproduced. Assuming that the tape feeding speed is N and normal reproduction is performed at N=1, there are varied reproduction speeds, for example, as expressed below:

00: N=1 (normal)
01: N<1 (slow)
10: 1<N<max. (search)
11: N=max. (FF or FR)

Data "display" which is in two bits designates the source of an image to be displayed on the monitor 18 while a section of the tape 112 corresponding to the applicable program is transported. The data is arranged, for example, as shown below:

00: Video tape 112; switch 152 to contact a
01: Disc 116; shift switch 151 to contact b and switch 152 to contact b
10: Frame memory 150; shift switch 151 to contact a and switch 152 to contact b
11: No display; muting at signal processing circuit 154.

Figure 10:
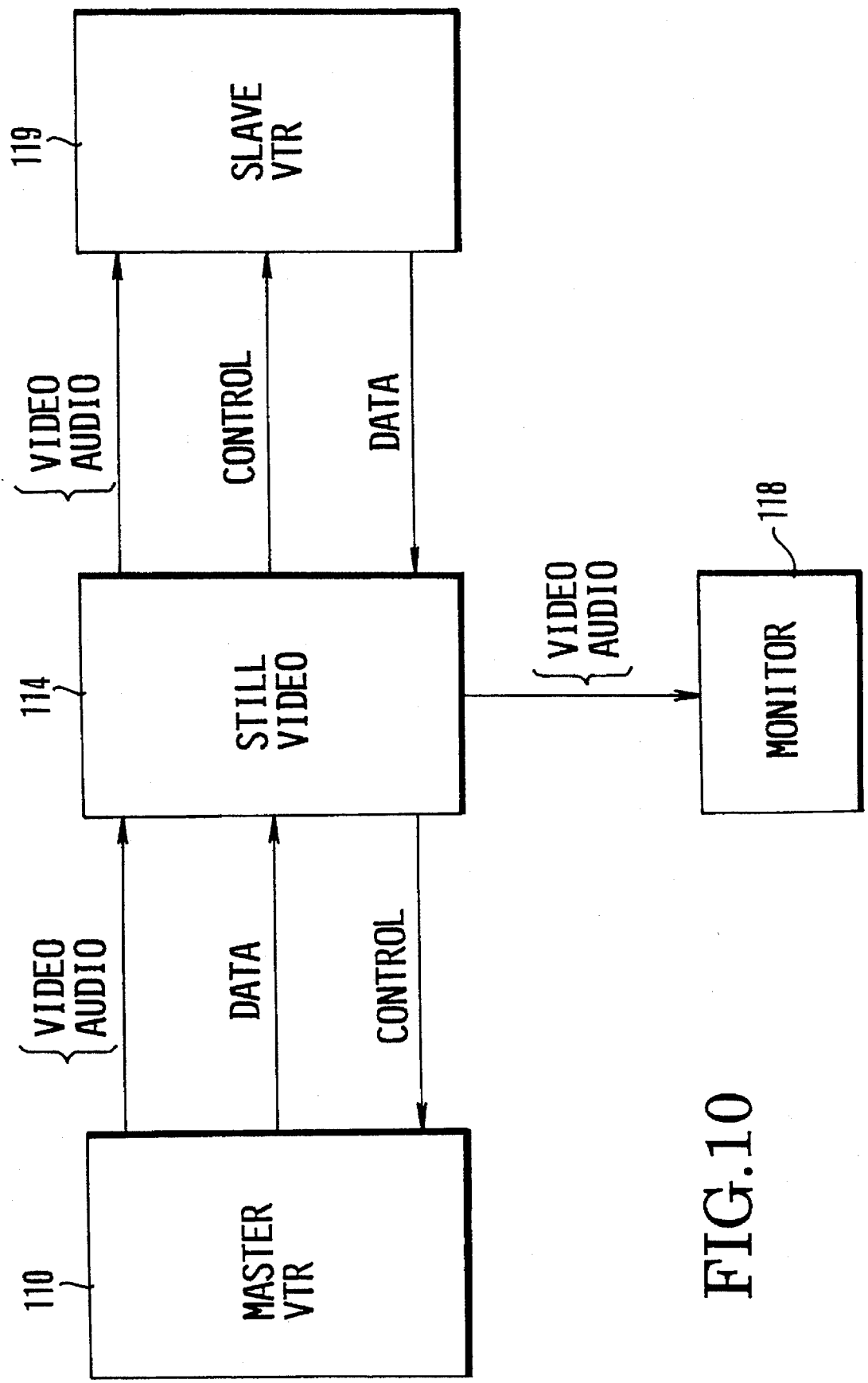
FIG. 10 is a diagram showing in outline the whole of a video system arranged as a further embodiment of the invention.

Data "slave control" which is in one bit is provided for use in performing editing work on the video tape 112 by connecting to the system a slave VTR 119 in a manner as shown in FIG. 10. The data is arranged, for example, to give information as shown below:

0: Stand-by for recording
1: Recording in process

Data "others" is additionally provided for other usages and is not absolutely necessary. The first two bits are used for designating four operation modes which, for example, includes:

00: Special reproduction speed. It serves as two lower bits for the "speed".
01: Special memory reproduction, special effect
10: Color back, instruction for writing into memory
11: Others, such as control over color tone and external device Four ensuing bits are used for designating the details of the mode designated. For example, in the case of the special reproduction speed, a total of 16 different reproduction speeds can be set for each of the slow mode (01) and the search mode (10). If "00" is set in designating the normal speed (N=1), the lower four places may be used for setting a still reproduction time.

The still video disc is provided with an extra track for overall control in addition to the first to 50th tracks which are normally used. This extra track may be used in defining an interrelation among cuts. Such arrangement makes a complex sequence control possible.

Figure 11:
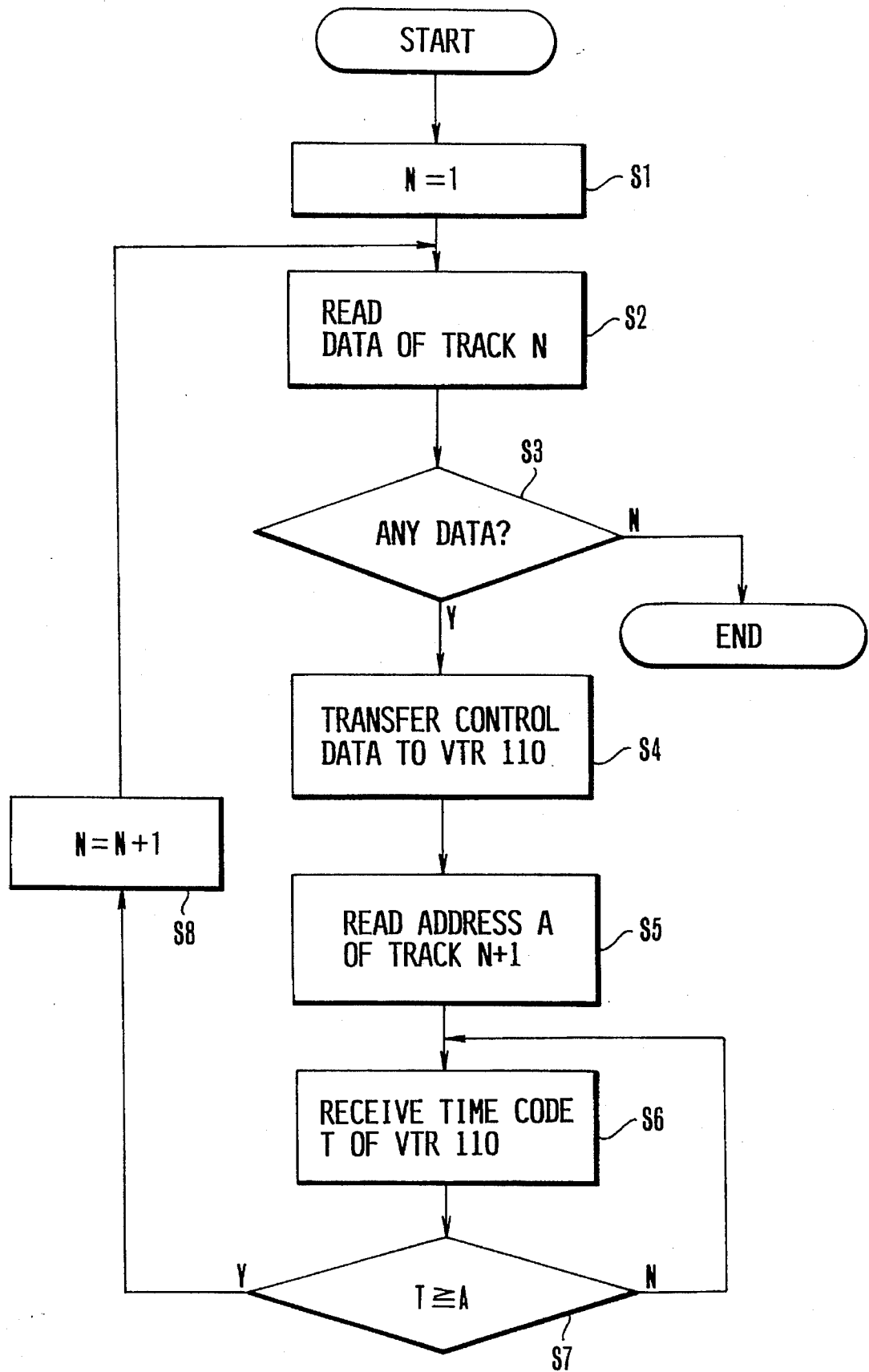
FIG. 11 is a flow chart showing the automatic reproducing operation of the system of FIG. 7.

In accordance with the reproduction control information which is obtained every time the record of one track of the disc 116 is reproduced, the system controller 132 of the still video recording and reproducing device 114 controls the system controller 126 of the VTR 110. Then, the controller 156 controls the switches 151 and 152, the frame memory 150 and the signal processing circuit 154 as mentioned in the foregoing. FIG. 11 is a flow chart showing an automatic reproducing operation which is thus accomplished. Referring to FIG. 11, The reproduction control information is reproduced from the first track of the disc 116 at steps S1 and S2. At a step S4: The control data thus obtained is supplied to the VTR 110 to cause the VTR 110 to operate in accordance with the control data. At a step S5: The address A of the second track is read in. At steps S6 and S7: With the address A compared with a time code T received from the VTR 110, the tape 112 is allowed to travel until the value of the time code T comes to exceed the value A. At steps S8 and S2: Data of the second track is read out when the value T comes to exceed the value A. At a step S3: The flow of operation proceeds until there remains no data.

One and the same video tape can be variously enjoyed by playing it back in varied manners with a plurality of still video discs of the above stated kind differently arranged.

Figure 12:
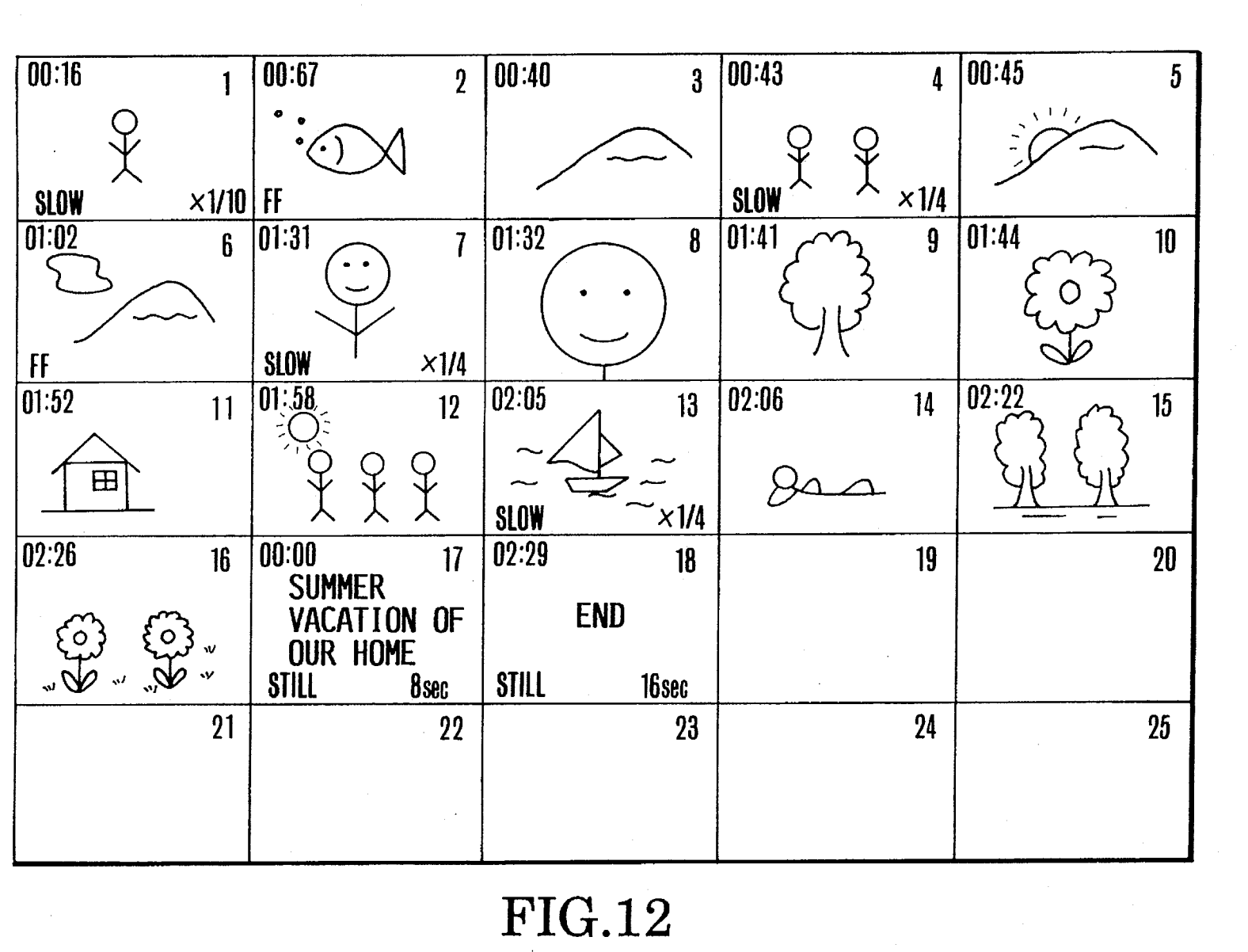

Referring to FIG. 12, the reproduction data of the still video disc 116 may be displayed in a multiple image plane displaying manner as shown in FIG. 12. Since the disc 116 has a total of 50 tracks, two multiple image planes may be arranged with each of them formed into a 5×5 matrix. This arrangement permits prompt confirmation of the contents of one disc 116 by just viewing two image planes. This greatly facilitate review of the contents of the disc 116. In this case, it is preferable to have time data and control data for reproducing speed, etc. superimposed on each of small image planes included in the multi-image plane. The multi-image plane is obtainable by reducing the period of sampling pulses of the controller 156 to ⅕ and by horizontally shifting the address, in accordance with a known method for digital television.

Further, a memory for storing ID data for 50 tracks may be arranged within the controller 156. Then, with all the ID data first read out at the start of reproduction, any title indication that is not recorded on the video tape 112 (for example, the 17th cut in FIG. 12) can be first displayed on the reproduced image plane.

While the embodiment described is arranged to use a video tape as the first recording medium and a still video disc as the second recording medium, this invention is not limited to the use of media of these kinds. Other recording media including an optical disc file and a solid-state memory such as a semiconductor memory are likewise usable.

As apparent from the foregoing description, the video system according to the invention permits not only complex programmed reproduction but also use of commercially available devices and apparatuses, so that the system can be arranged at a low cost.

What is claimed is:

1. A video signal processing system, comprising:
   (a) input means for inputting moving image signals which have programs, image plane portions of the moving image signals defining representative still picture signals;
   (b) first storing means for storing moving image signals, said first storing means further storing control information;
   (c) second storing means for storing still picture signals;
   (d) extracting means for extracting still picture signals from the moving image signals input by said input means and the moving image signals read out from said first storing means;
   (e) generating means for generating control information according to the moving image signals input by said input means; and
   (f) mode setting means for setting a mode of said system among a plurality of modes,
   said plurality of modes including a first mode in which said first storing means stores the moving image signals input from said input means, said second storing means stores the still picture signals extracted from the moving image signals input by said input means and the control information generated by said generating means is also stored and second mode in which said second storing means stores the still picture signals extracted from the moving image signals read out from said first storing means and control information read out from said first storing means is also stored.

2. A system according to claim 1, wherein the first storing means is capable of sequential access, and the second storing means is capable of random access.

3. A system according to claim 1, further comprising control means for controlling an operation of the first storing means according to control information read out from the second storing means.

4. A system according to claim 3, wherein the control means has designating means for designating one control information reproduced from the second storing means and controls an operation of the first storing means according to the control information designated by the designating means and the control information read out from the first storing means.

5. A system according to claim 3, wherein the control means controls an operation of the first storing means according to the control information reproduced from the second storing means and the control information read out from the first storing means.

6. A system according to claim 1, wherein said second storing means includes a semiconductor memory.

7. A system according to claim 1, wherein said first storing means includes a magnetic tape.

8. A video signal processing system, comprising:
   (a) input means for inputting moving image signals which have programs, image plane portions of the moving image signals defining representative still picture signals;
   (b) first storing means for storing moving image signals, said first storing means further storing control information;
   (c) second storing means for storing still picture signals;
   (d) extracting means for extracting still picture signals from the moving image signals input by said input means and the moving image signals read out from said first storing means;
   (e) control means for controlling an operation of said first storing means; and
   (f) mode setting means for setting a mode of said system among a plurality of modes,
   said plurality of modes including a first mode in which said first storing means stores the moving image signals input from said input means, said second storing means stores the still picture signals extracted from the moving image signals input by said input means and said control means controls the operation of said first storing means in accordance with stored control information and second mode in which said second storing means stores the still picture signals extracted from the moving image signals read out from said first storing means and said control means controls the operation of said first storing means in accordance with stored control information.

9. A video signal processing apparatus for use in a system for recording and reproducing moving image signals to and from first storing means and for recording still image signals to second storing means, comprising:
   (a) input means for inputting moving image signals which have programs, image plane portions of the moving image signals defining representative still image signals,
   said first storing means storing the moving image signals input by said input means and control information;
   (b) extracting means for extracting still image signals from the moving image signals input by said input means and the moving image signals read out from said first storing means;
   (c) generating means for generating the control information according to the moving image signals input by said input means; and
   (d) mode setting means for setting a mode of said system among a plurality of modes,
   said plurality of modes including a first mode in which said first storing means stores the moving image signals input from said input means, said second storing means stores the still picture signals extracted from the moving image signals input by said input means and the control information generated by said generating means is also stored and second mode in which said second storing means stores the still picture signals extracted from the moving image signals read out from said first storing means and control information read out from said first storing means is also stored.

10. A system according to claim 9, wherein the first storing means is capable of sequential access, and the second storing means is capable of random access.

11. A system according to claim 9, further comprising control means for controlling an operation of the first storing means according to control information read out from the second storing means.

12. A system according to claim 11, wherein the control means has designating means for designating one control information reproduced from the second storing means and controls an operation of the first storing means according to the control information designated by the designating means and the control information read out from the first storing means.

13. A system according to claim 11, wherein the control means controls an operation of the first storing means according to the control information reproduced from the second storing means and the control information read out from the first storing means.

14. A system according to claim 9, wherein said second storing means includes a semiconductor memory.

15. A system according to claim 9, wherein said first storing means includes a magnetic tape.

16. A VTR system, comprising:
- (a) input means for inputting moving image signals which have programs, image plane portions of the moving image signals defining representative still image signals;
- (b) a transducer for tracing a magnetic tape to record the moving image signals input by said input means and to reproduce the moving image signals and control information from the magnetic tape;
- (c) a recorder for recording still image signals to a memory device;
- (d) extracting means for extracting still image signals from the moving image signals input by said input means and the moving image signals reproduced by the transducer; and
- (e) generating means for generating control information according to the moving image signals input by said input means, said system having a first mode in which the transducer records the moving image signals input by said input means the recorder records the still image signals extracted from the moving image signals input by said input means and the control information generated by said generating means to the memory device and a second mode in which the recorder records the still image signals extracted from the moving image signals and the control information reproduced by the transducer.

* * * * *